Sept. 7, 1937.   G. E. NIX   2,092,679
SPRING TOOTH CULTIVATOR
Filed Aug. 20, 1936
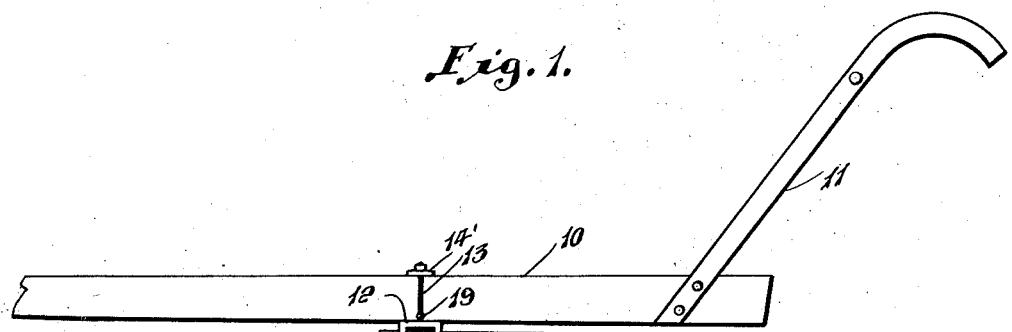
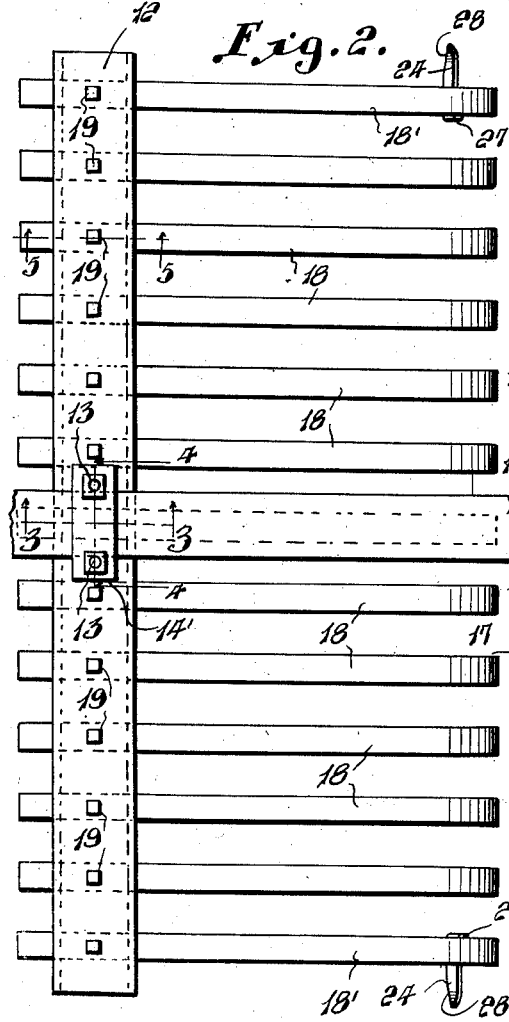
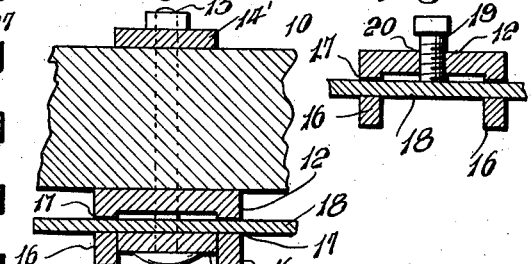
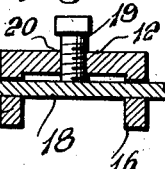
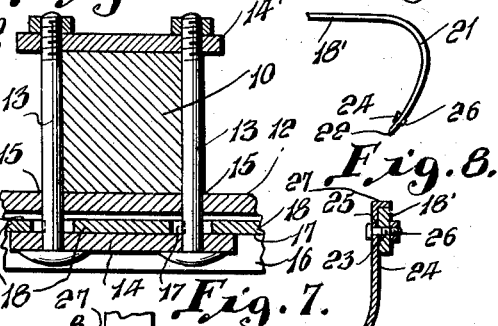
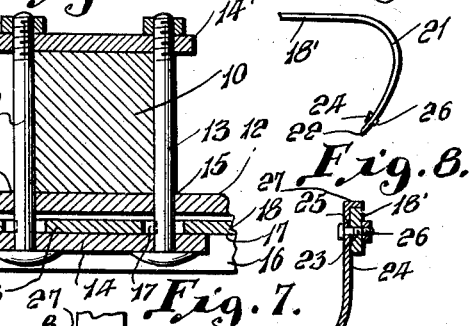
Inventor
George E. Nix
By L. F. Randolph
Attorney Patented Sept. 7, 1937

2,092,679

UNITED STATES PATENT OFFICE 2,092,679

SPRING TOOTH CULTIVATOR

George E. Nix, Phil Campbell, Ala.

Application August 20, 1936, Serial No. 97,063

7 Claims. (Cl. 55—127)

This invention relates to cultivators of the spring tooth type.

The object of the invention is to provide means whereby the teeth can be readily removed, attached or adjusted laterally to conform to the requirements of the work to be done.

A further object of the invention is to provide an attachment to be secured to certain of the teeth to push the soil up to or around the plants being cultivated.

Other objects and advantages of the invention will become apparent from the drawing and the description.

In the drawing:—

Figure 1 is a view in side elevation of the device assembled on a plow beam;

Figure 2 is a top plan view of the channel member with the teeth secured in position;

Figure 3 is an enlarged fragmentary sectional view on the line 3—3 of Figure 2;

Figure 4 is an enlarged fragmentary view in cross section on the line 4—4 of Figure 2;

Figure 5 is an enlarged sectional view on the line 5—5 of Figure 2;

Figure 6 is a fragmentary view in side elevation showing a tooth with the spring sweep attachment applied to the tooth;

Figure 7 is a front elevation of the parts shown in Figure 6, and

Figure 8 is a cross sectional view showing the means for securing the sweep to a tooth.

Referring more particularly to the drawing wherein like reference characters designate like or corresponding parts in the different views, the cultivator beam 10 has the handles 11 secured adjacent one end thereof.

A channel member 12 is secured to the underside and transversely to the beam 10 by nuts and bolts 13 and plates 14 and 14'. The plates 14 and 14' have openings therein alined with openings 15 in the member 12 all of which openings are adapted to receive the bolts 13. The plates 14 and 14' are secured at the opposite ends of the bolts 13. The plate 14 rests upon the heads of the bolts 13 and bears against the underside of the channel member 12, the plate 14' rests upon the upper face of beam 10. The bolts 13 are mounted in the alined openings in plate 14, openings 15 and in the openings in plate 14'. The bolts 13 extend upwardly one on each side of beam 10 and threaded nuts are secured to their upper ends and bear against the upper face of plate 14' to hold the parts in position.

The opposite flanges 16 of the channel member 12 have alined openings 17 to receive spring teeth 18. The openings 17 are sufficiently wide to permit the teeth 18 being adjusted laterally. The middle tooth 18 is held in position by the plate 14 which rests in the U-shaped portion of the member 12 and holds the member 12 against the underside of the beam 10. The other teeth 18 are held in position by means of threaded bolts 19 which engage openings 20 in the channel member 12 and are adapted to have their lower ends bearing against the upper face of the teeth 18 to clamp the teeth in position as best shown in Figure 5.

The teeth 18 are curved downwardly and forwardly as shown at 21 and have their free ends 22 pointed to engage the earth.

The end teeth designated 18' have openings 23 adjacent their pointed ends 22. Openings 23 when alined with openings 25 in the spring sweeps 24 are adapted to receive a bolt 26 to secure said sweep 24 to each of the teeth 18'.

Each sweep 24 is provided with a flange 27 to bear against the edge of the tooth 18' to prevent rocking movement when in position. The sweep 24 has its lower edge 28 inclined upwardly and outwardly to provide for deposit of the soil scraped thereby around the plants being cultivated.

It is understood that merely the preferred embodiment of the invention has been shown and described, the right being reserved to make such changes and modifications as will not depart from the spirit and scope of the invention.

I claim as my invention:—

1. In a device of the class described, a beam, a channel shaped member removably secured to said beam, the opposite flanges of said channel member being provided with alined openings, spring teeth secured in said openings, and threaded bolts engaging threaded openings in said channel member and bearing against said teeth to hold said teeth in position.

2. A spring tooth cultivator, comprising a beam, a channel shaped member secured to said beam, the opposite flanges of said member being provided with alined openings to receive spring cultivator teeth, said openings being elongated to permit lateral adjustment of said teeth, and said teeth being held in adjusted positions by means of bolts mounted in threaded openings in said channel member and engaging said teeth to hold them in position.

3. A spring tooth cultivator, comprising a beam, a channel member secured laterally to said beam, spring teeth adjustably held in alined openings in the opposite flanges of said channel member, threaded bolts mounted in said channel member and adapted to bear against said teeth to hold them in position, said teeth being curved downwardly and forwardly.

4. A spring tooth cultivator comprising a beam, a channel member secured to said beam, the opposite flanges of said channel member being provided with alined openings, spring teeth held in said openings by means of threaded bolts, said teeth being curved downwardly and forwardly and pointed at their free end, some of said teeth being provided with an opening adjacent their free ends, spring sweeps secured to said teeth by means of a bolt mounted in an opening in said sweeps and in the opening in said teeth.

5. A device as in claim 4, said sweep having a flange on one end to engage the edge of its secured tooth to prevent rocking movement of said sweep.

6. A cultivator comprising a beam, a channel shaped member secured to said beam, the opposite flanges of said channel member being provided with openings, spring teeth mounted in said openings and adapted to be adjusted laterally therein.

7. A cultivator comprising a longitudinal member, a channel shaped member having its opposite flanges provided with openings, spring teeth mounted in said openings and adapted to be adjusted laterally therein, and clamping means to hold said teeth in adjusted positions.

GEORGE E. NIX.